CONTROL ARRANGEMENT FOR A SWITCHING NETWORK

Filed April 15, 1965 6 Sheets-Sheet 1

INVENTOR
F. F. TAYLOR
BY John C Albert
ATTORNEY

July 30, 1968 F. F. TAYLOR 3,395,251

CONTROL ARRANGEMENT FOR A SWITCHING NETWORK

Filed April 15, 1965 6 Sheets-Sheet 2

CONTROL ARRANGEMENT FOR A SWITCHING NETWORK

Filed April 15, 1965 6 Sheets-Sheet 4

CONTROL ARRANGEMENT FOR A SWITCHING NETWORK

Filed April 15, 1965 6 Sheets-Sheet 6

United States Patent Office 3,395,251
Patented July 30, 1968

3,395,251
CONTROL ARRANGEMENT FOR A SWITCHING NETWORK

Frank F. Taylor, Asbury Park, N.J., assignor to Bell Telephone Laboratories, Incorporated, New York, N.Y., a corporation of New York
Filed Apr. 15, 1965, Ser. No. 448,312
5 Claims. (Cl. 179—18)

ABSTRACT OF THE DISCLOSURE

An end-marked space division switching network employing differentially wound ferreed switches as crosspoint devices. Each crosspoint ferreed has an additional winding, controlled by a bistable switch which is included in the control conductor of each output link and which is responsive to signals on the control conductor. Magnetic flux of the additional winding cancels the flux of one of the two operate windings of the ferreed in order to effect the opening of the crosspoint.

This invention relates to communication switching networks, and, more particularly, to a space division network which employs electromechanical crosspoints.

In my copending patent application, Ser. No. 441,974, filed Mar. 23, 1965, there is shown an illustrative end-marked multistage space division network which employs differentially wound ferreed switches as crosspoint devices and in which a record of the busy-idle states of the links of the possible paths through the network is maintained by means of link memory elements which are controlled directly over the network control paths.

Differentially wound ferreed switches which are suitable for use in this network are described in T. N. Lowry Patent 3,037,085 issued May 29, 1962 to which reference may be made for a further description. The differentially wound ferreed has two stable states (open and closed) and has two operate control windings which are usually of equal impedance. Each winding comprises two portions with one portion of each winding wound on each of the two magnetic elements of the switch. In the following description a ferreed switch winding is always considered to comprise the two portions as set forth above. It is characteristic of differentially wound ferreed switches that coincidence of current through the two control windings tends to effect closure of the switch contacts, while passage of current through either of the two control windings alone effects release of the switch contacts. In the illustrative embodiment of my copending application the link busy-idle memory elements comprise modified differentially wound ferreed switches. The modified switches comprise a first low impedance control winding and a second high impedance control winding which is connected in parallel with contacts of the modified switch. The windings of the link busy-idle switch are connected in series with the link control path, and the low impedance state of the path which occurs when the switch contacts are closed represents the idle state of the link, and the high impedance state which occurs when the switch contacts are open represents the busy state of the link. A link busy-idle switch so connected is responsive to a first network control signal over the link control path to set the busy-idle element to the busy state and to the next succeeding control signal over the same control path to reset the memory element to the idle state. It is characteristic of this arrangement that each control signal tends to close the crosspoints which make up the selected path. At the time of disconnect, the busy-idle elements of the links employed in the connection are reset to their idle state and the network connection is maintained.

Such arrangements are satisfactory in many switching systems; however, there are situations in which it is desirable to open the switches of one or more stages at the time a network path is released.

It is an object of this invention to provide an improved switching arrangement wherein successive enablement of the network control paths effects alternately closure and release of the crosspoint defined by the enabled path.

In an illustrative embodiment of my present invention the independent switches of the stages which are to be opened at time of disconnect comprise differentially wound ferreed switches which include a third winding as network crosspoint devices. The third winding of a switch when energized balances the flux generated by one of the normal differential windings and therefore effects release of the associated crosspoint contacts. In this embodiment of my invention the tertiary windings of the crosspoint switches of a column are connected in series with the high impedance control winding of the link busy-idle switch and this series arrangement of windings is connected in parallel with the switch contacts of the output link busy-idle switch. Advantageously, this arrangement effects release of the crosspoints at the time that the output link of the busy-idle element is reset to the idle state and thus the path between the previously connected network terminals is opened.

In accordance with one feature of this invention, a network crosspoint device includes an inhibiting means which is under control of a link busy-idle memory element.

It is another feature of my invention that the inhibiting means include an additional winding of the crosspoint devices. More specifically, in accordance with this feature and wherein the crosspoint devices include differentially wound ferreeds, a third winding is included to counterbalance the magnetic effect of one of the differential windings.

The above and other objects and features of this invention may be understood from the following description of the illustrative embodiment when read with respect to the drawing in which.

Figure 1:
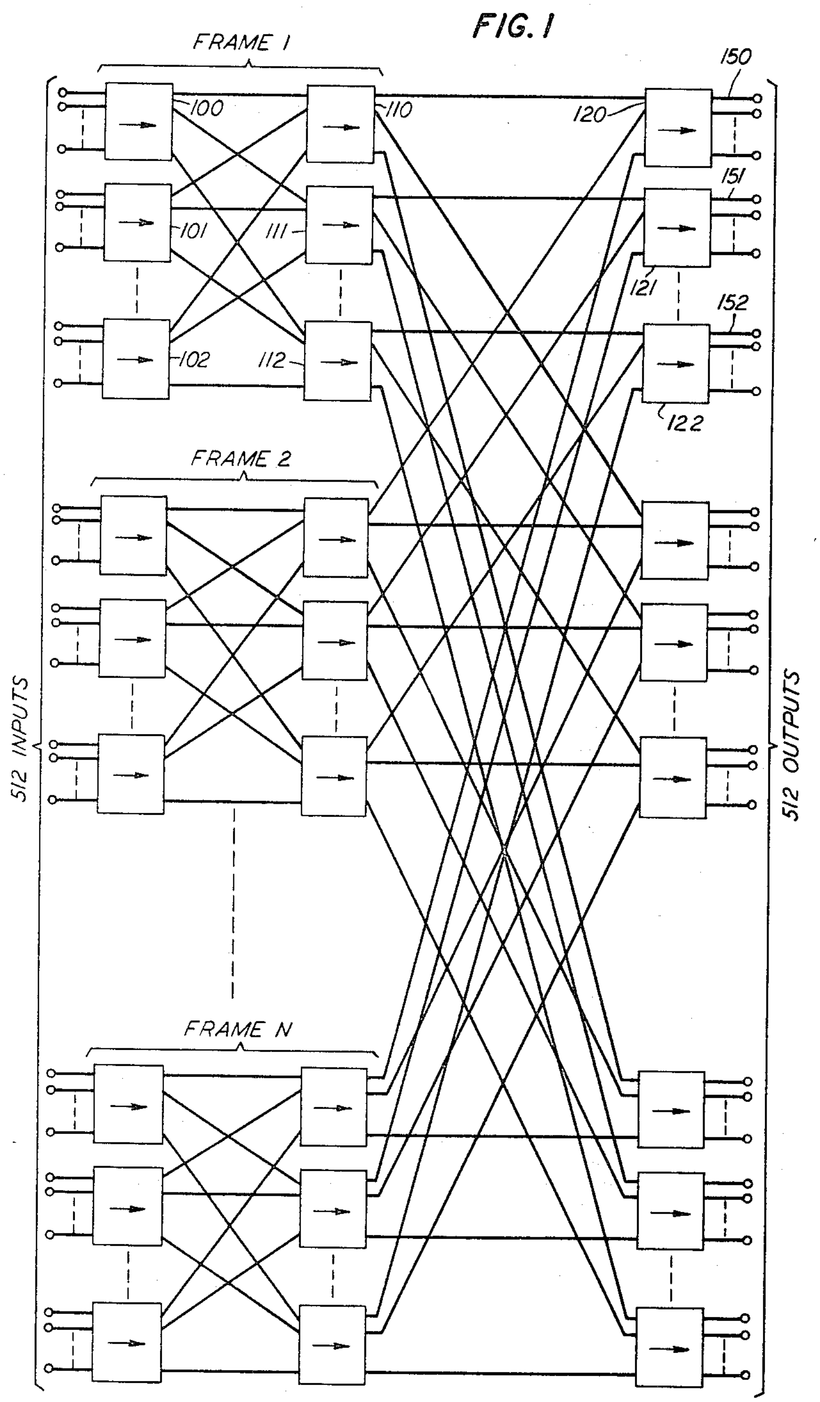
FIG. 1 is a symbolic representation of a three stage switch module.

The switching network module of FIG. 1 comprises three stages of independent switches. This network module provides a single communication path between the input link of a first stage switch and the output link of a third stage switch. For purposes of illustration only it may be assumed that the independent switches 100, 101, 102, 110, 111, 112, 120, 121 and 122 each have eight input links and eight output links. A network module of FIG. 1 may be termed a superframe and in the illustrative embodiment a superframe comprises sixty-four independent switches per stage thus a superframe serves 512 input links and has 512 third stage output links.

Figure 2:
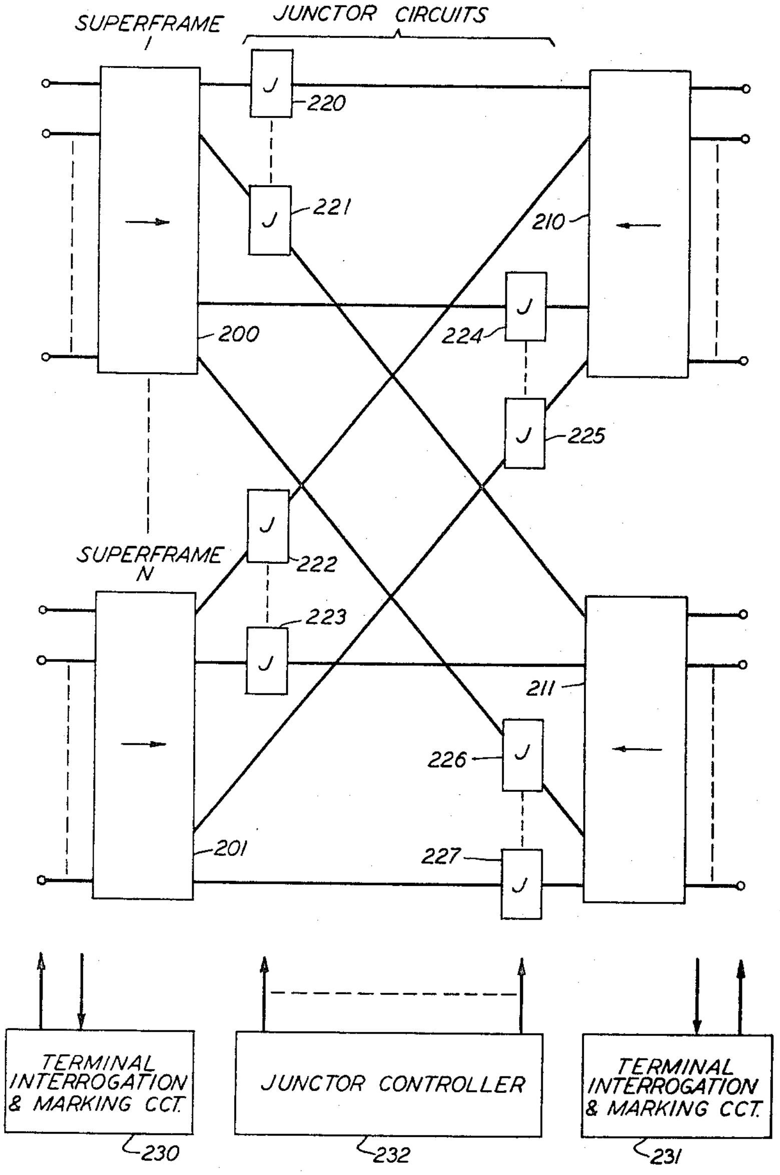
FIG. 2 is a symbolic representation of a six stage switching network comprising a plurality of modules of modules of FIG. 1.

A six stage switching network which comprises a plurality of superframes is illustrated in FIG. 2. This network comprises a plurality of left side superframes 200, 201 and a plurality of right side superframes 210, 211. The right side superframes are a mirror image of the left side superframes in the illustrative embodiment, that is, the terminals on the right side of the network correspond to the terminals on the left side of the network. The output links of the left superframes are connected to the output links of the right superframes in a pattern such as is shown in FIG. 2. Superframe interconnection is established through junctor circuits such as 220 through 227. Interrogation of a network to determine an idle path between selected left side and right side terminals is accomplished by means of the terminal interrogation and marking circuits 230, 231 in conjunction with the junctor controller circuit 232. After an idle path has been found, these same circuits cooperate to mark appropriate network terminals to establish the desired network paths.

Figure 3:
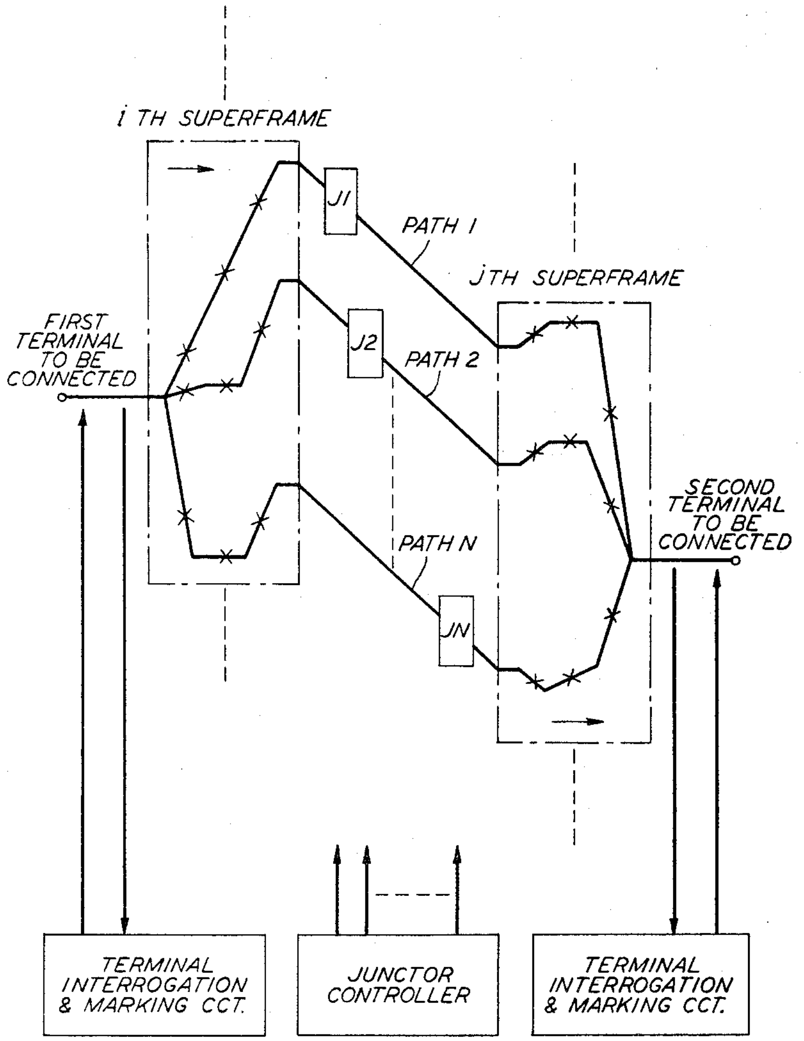
FIG. 3 is a schematic representation of possible connections between selected terminals of the network of FIG. 2.

There is only one possible path between a group of input terminals served by a first stage switch such as 100, 101, and 102 and superframe output links such as 150, 151, and 152. The wiring pattern shown in FIG. 2. however, provides a plurality of paths between a left side input terminal and a right side input terminal. The junctors 220–227 are assigned to junctor blocks. The junctors of a block provide paths between different groups of input and output terminals of a superframe. Therefore, there is never more than one junctor within a junctor block which can provide a network path between a selected left side input terminal and a selected output terminal or between a selected right side input terminal and a selected right side output terminal. It is therefore possible to locate an idle path through the network by sequentially enabling the junctor blocks. The plurality of paths between a selected left side input terminal and a selected right side input terminal are shown by way of example in FIG. 3.

Figure 4C:
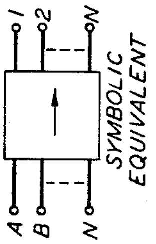
FIG. 4C is a symbolic representation of the switch of FIGS. 4A and 4B.
Figure 4B:
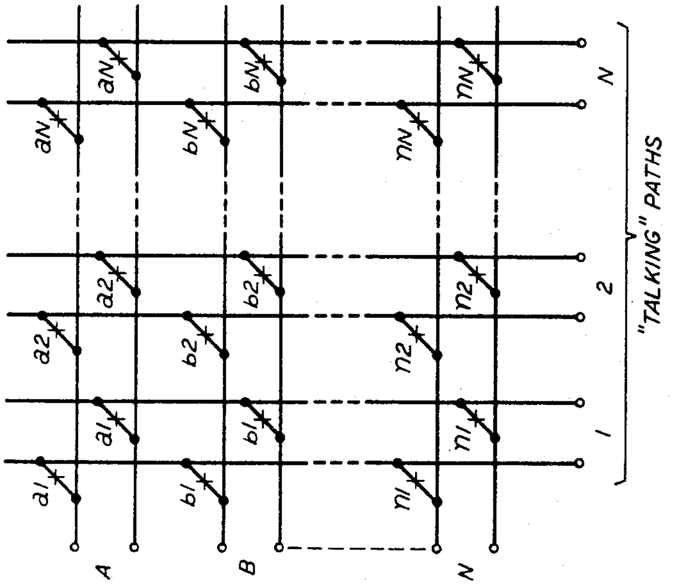
FIG. 4B shows the transmission paths associated with the control conductors of FIG. 4A.
Figure 4A:
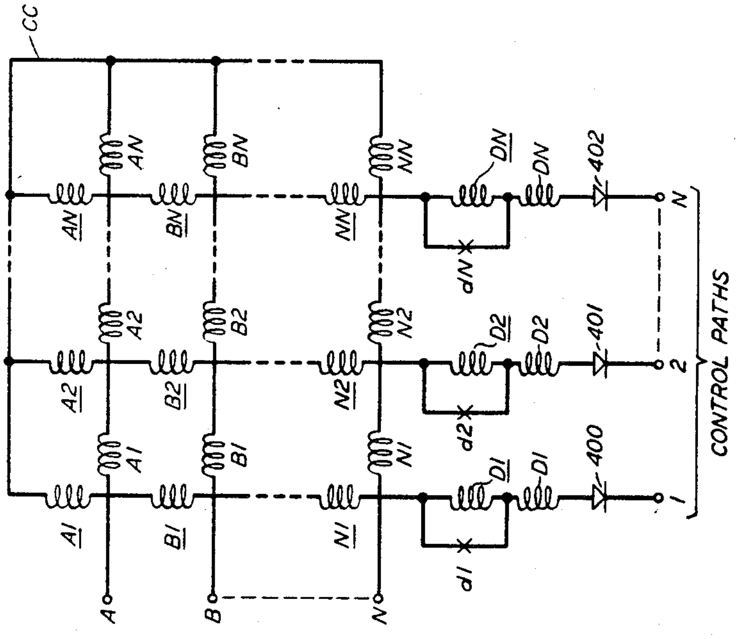
FIG. 4A is a schematic representation of the control conductors of the unmodified switches of the network of FIG. 1.

FIGS. 4A, 4B, and 4C illustrate the independent switches such as 100, 101, 102, 111, 112, 120, 121, and 122, which make up the superframe of FIG. 1 as set forth in my copending application, Serial No. 441,974, filed Mar. 23, 1965.

FIG. 4A shows a coordinate array of differentially wound ferreed switches which provide selective connections between the input links and the output links of an independent switch. A ferreed crosspoint switch comprises contacts such as *a*1 and two operate windings such as A1, A1 which are termed the row control windings and the column control windings, respectively. Coincident energization of the two coils A1 and A1 in appropriate relationship tends to effect closure of the contacts *a*1 associated with the coils.

Figures 6A, 6B, 6C, 6D:
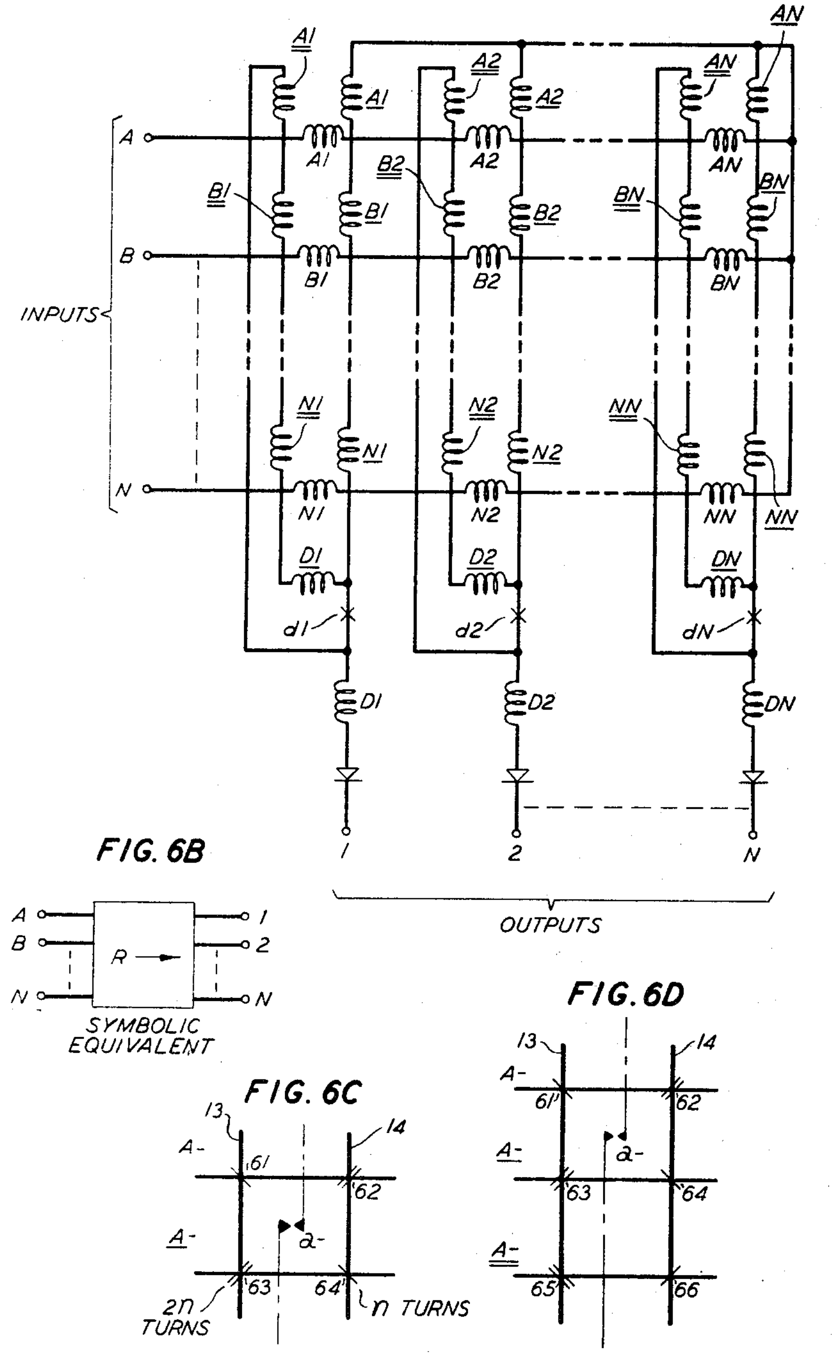
FIG. 6A is a schematic representation of a switch, in accordance with one specific embodiment of my invention, to effect release of the connection at the time the busy-idle elements are set to idle.
FIG. 6B is a symbolic representation of the switch of FIG. 6A.
FIGS. 6C and 6D show the arrangement of windings of the crosspoints of FIGS. 4 and 6 respectively.

The windings for the operate differentially wound crosspoint devices of FIG. 4A are shown schematically in FIG. 6C. As previously noted herein and as explained more completely in the aforenoted Patent 3,037,085, a differentially wound ferreed switch has two operate magnetic members and two windings. There are two basic forms of ferreed switches, namely, a parallel form and the series form. The principles of my invention are independent of such distinguishing characteristics and the parallel form, which is shown in FIGS. 6C and 6D, is employed for purposes of illustration only. In FIG. 6C there are shown two bistable magnetic members 13 and 14 and the two operate windings A— and A—. These windings correspond to windings such as A1 and A1 of FIG. 4A. As shown in FIG. 6C, the winding A— has a first portion 61 wound on the left member 13 and the second portion 62 on the right member 14. The symbology employed in this figure indicates that there is a winding of *n* turns on the member 13 and a winding of 2*n* turns on the member 14. Similarly, the winding A— has a first portion 63 of 2*n* turns on the the member 13 and the second portion 64 of *n* turns on the member 14. The construction of the parallel ferreed of FIG. 6C is such that when both the left and right members 13 and 14 are simultaneously magnetized in the up direction or in the down direction, the contacts *a*— will be closed and when the two members 13 and 14 are magnetized in opposite directions, the associated contacts *a*— will be opened. Assuming that the windings A— and A— of FIG. 6C are both energized by signals of the same polarity and same amplitude, the net magnetomotive force applied to the members 13 and 14 will switch both members in the same direction, either up or down, depending upon the polarity of the applied signals, as only the magnetomotive force generated by *n* turns is required to switch the state or direction of magnetization. Thus, coincident energization of the two operate windings effects closure of the associated contacts *a*—. Subsequent enablement of either one, but not both, of the operate windings A— and A— will serve to switch one of the two members and therefore provide a magnetic configuration wherein the left and right members are magnetized in opposite directions. In this magnetic configuration the associated contacts *a*— will be opened.

FIG. 4A shows the interconnections of the row windings of the ferreed switches by means of row control conductors and an interconnection of the column control windings of the ferreed switches by column control conductors as shown in W. S. Hayward, Jr. Patent 3,110,772, issued Nov. 12, 1963, in which one end of each column control conductor and one end of each row conductor are connected by a conductor CC. The energization of either one but not both of the operate control windings A1, A1 tends to cause operated switch contacts to release. In FIG. 4 a connection can be achieved between a selected input link and a selected output link by applying marking potentials to the control conductor of the selected row and to the control conductor of the selected column. For example, in FIG. 4A application of cooperating marking potentials to the row control conductor A and to the column control conductor N, serves to close the switch contacts an associated with the windings AN, AN. This also tends to release contacts of the switches having coil windings A1, A2, et cetera, in series with the row control winding AN and switches having column control windings BN, NN in series with the column control winding AN. Accordingly, after the desired connection between the A input link and the N output link has been completed, all prior connections to the A input link and the N output link have been released.

In the illustrative example, the switching network is considered to comprise two wire talking paths and the talking path conductors associated with the input and output link control conductors of FIG. 4A are shown in FIG. 4B. In FIG. 4B, the contacts *a*1 are associated with the windings A1, A1, et cetera. FIG. 4C, as previously noted, is a symbolic equivalent of the arrangements of FIGS. 4A and 4B taken together.

As shown in FIG. 4A, each output link of an independent switch has the two windings of a modified differentially wound ferreed switch in series with each output link column control conductor. As previously explained and as further set forth in my above-mentioned application, the two windings DN, DN are of unequal impedance. The high impedance winding DN is shunted by the contact *dn*. The windings D1, D1, D2, D2 comprise differentially wound pairs. The diodes 400, 401, 402 serve to isolate the control paths of the network to avoid the effects of sneak currents. When the contacts such as *d*1 through *dn* are closed, the associated high impedance windings are shunted. Therefore, the control path between a selected input terminal and a selected output terminal includes only low impedance windings and the sum of the impedances of all of these low impedance windings is low compared to the impedance of a high impedance winding, such as $\underline{\text{D1}}$, $\underline{\text{D2}}$, et cetera. Accordingly, a link is considered to be in the idle state when the contacts of the link busy-idle switch are closed and to be busy when the contacts of the link busy-idle switch are open. In the illustrative network, the cooperating potentials which are employed to mark the terminals of the network must always be applied in the same sense since the control path always includes diodes such as 400, 401, and 402. When an idle path is found through the network, this path is pulsed to effect closure of desired crosspoints. Pulsing of the path sets the busy-idle memory elements to the busy state at the same time that the desired path is established. Subsequently when the need for the connection is terminated, the same control path which was employed to establish the desired connection must be again energized to reset the busy-idle memory elements of the links to be released. Since the crosspoint switches of my copending application cannot differentiate between pulses which are employd to set the busy-idle links to the busy state and those which are employed to reset the busy-idle elements to the idle state, the crosspoints associated with the path always tend to close.

As previously noted, when a new connection is established through the network, all previous connections to the input and output links employed in the new connection are released. In many instances there is no objection to leaving the physical connection between the input and output links established through the network.

Figure 5:
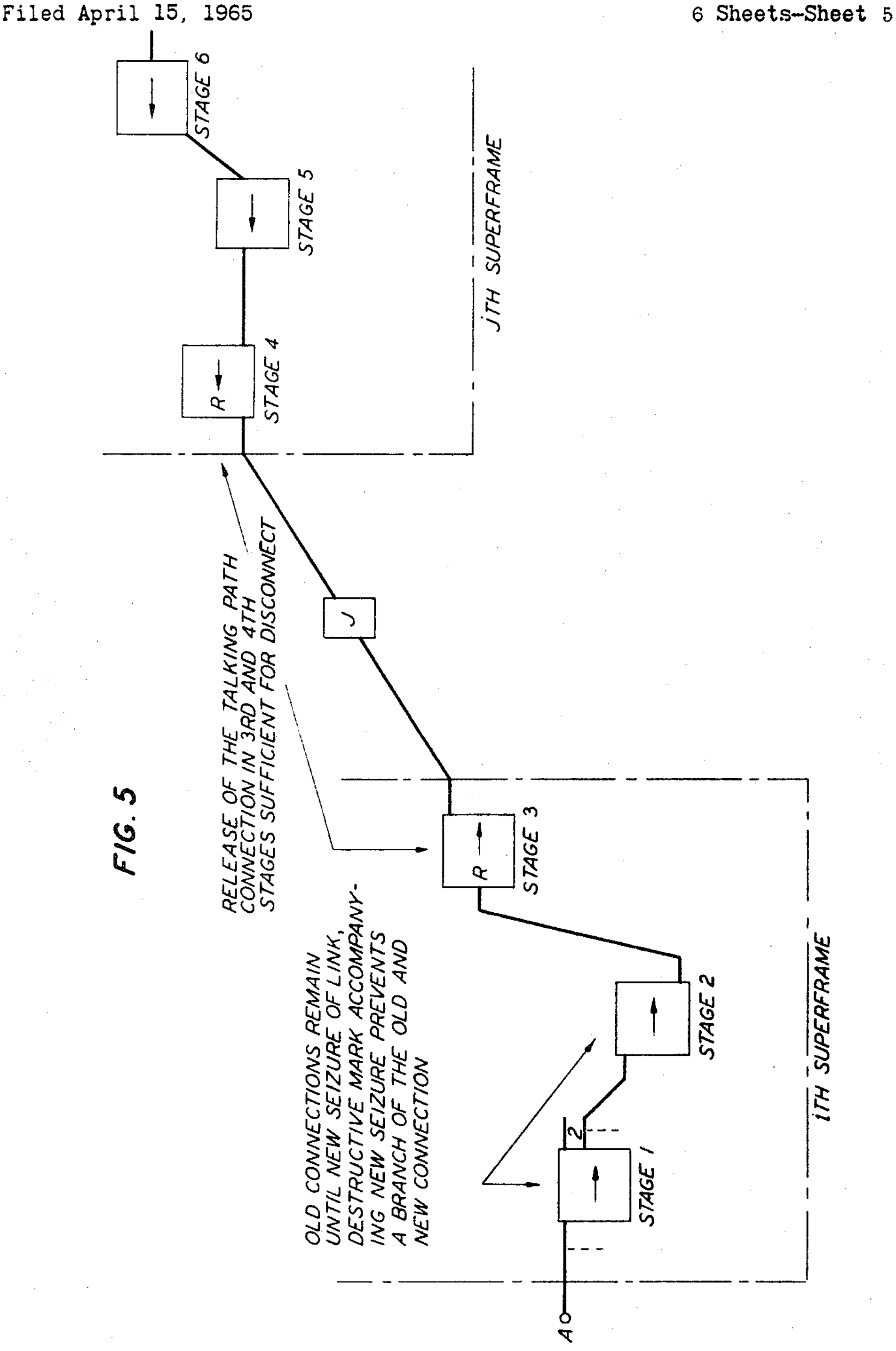
FIG. 5 is a schematic representation in which switches in accordance with my present invention are employed in the third and fourth stages of the switching network.

There are, however, systems in which it is desirable to break the network path in at least one stage at time of path release. In accordance with the illustrative embodiment of my invention as shown in FIG. 5, I provide a special release type switch in the two central stages of the network. In FIG. 5, there is illustrated the make-up of a portion of one path through the network and there it is seen that stages one, two, five, and six comprise switches as shown in FIGS. 4A and 4B while stages three and four comprise switches such as are shown schematically in FIG. 6A and symbolically in FIG. 6B.

The switches of FIG. 6A have associated transmission paths which correspond to the arrangements of FIG. 4B; however, these are not shown. In FIG. 6A a crosspoint device comprises a differentially wound ferreed switch having normal differential windings A1, $\underline{\text{A1}}$ and tertiary balancing windings such as $\underline{\underline{\text{A1}}}$, $\underline{\underline{\text{A2}}}$ which, when energized, neutralize the effect of corresponding windings $\underline{\text{A1}}$, $\underline{\text{A2}}$.

The arrangement of the windings A—, $\underline{\text{A—}}$, and $\underline{\underline{\text{A—}}}$ are shown schematically in FIG. 6D. The winding $\underline{\underline{\text{A—}}}$ includes a first portion 61 of $n$ turns on magnetic member 13 and a second portion 62 of $2n$ turns on member 14 while the portions 63 and 64 of winding $\underline{\text{A—}}$ are just the opposite. This relationship corresponds to that previously described for FIG. 6C. Further, it is to be recalled that differential ferreed operation depends on the net magnetomotive force applied to each member, with the force resulting from an $n$ turn winding portion being sufficient to switch the direction of magnetization.

In accordance with an aspect of my invention an inhibit winding $\underline{\underline{\text{A—}}}$ is also included in each ferreed crosspoint switch. The function of the inhibit winding is to counterbalance the magnetic effect of one of the other windings. This may be attained in several ways, one illustrative manner being depicted in FIG. 6D wherein the effect of winding $\underline{\text{A—}}$ is removed or canceled. When a particular crosspoint ferreed is to be released, as described further below, all three windings are pulsed. Normally, energization of windings A— and $\underline{\text{A—}}$ would result in both magnetic members 13 and 14 being set in the same direction. It is therefore necessary to counterbalance the effect of one of these windings on at least one of the members. This is accomplished by winding 65 which assures that, on pulsing of all three windings A—, $\underline{\text{A—}}$, $\underline{\underline{\text{A—}}}$, members, 13 and 14 are oppositely magnetized, the two controlling winding portions being portions 61 and 62 of winding A—. Since winding portion 62 already overbalances portion 64, a second portion of winding $\underline{\underline{\text{A—}}}$ is not required on member 14 to assure proper operation when all three windings are energized. However, under certain circumstances winding 66 may be needed to prevent improper closure of crosspoints of a column which have only one normal differential winding and a tertiary winding energized.

As shown in FIG. 6A, the tertiary windings of the crosspoint devices of a column are all connected in series with the high impedance winding $\underline{\text{D1}}$ of the output link busy-idle memory element and the busy-idle memory element contacts such as *d*1 are connected in shunt with the associated series arrangement of windings. When an output link is in the idle state, its switch contacts *d*1, *d*2, et cetera, are closed and the series path which includes the high impedance windings of the link busy-idle memory element and the tertiary windings of the crosspoint of that link are shunted. Accordingly, when an idle path has been found and cooperating marking potentials are applied to a selected input terminal and a selected output terminal, the selected crosspoint device will operate in the manner described with respect to FIG. 4A. Again, as described with respect to FIG. 4A, the link busy-idle memory switch of an idle link has only the windings such as D1 energized; therefore, the contact *d*1 will be opened to make the link busy. In the link busy state, a high impedance winding such as $\underline{\text{D1}}$ and the tertiary windings such as $\underline{\underline{\text{A1}}}$, $\underline{\underline{\text{B1}}}$, $\underline{\underline{\text{N1}}}$ will be in series with the column control conductor and the control winding D1. Accordingly, when the link is to be released, the control path includes the tertiary windings of a column. If an established path has included the A input link and the 1 output link, the A input control terminal and the 1 output control terminal are marked with cooperating potentials to reset the link busy-idle memory element to the idle state and to effect release of the switch which includes the windings A1, $\underline{\text{A1}}$, and $\underline{\underline{\text{A1}}}$. Since the contacts *d*1 are open, this path includes both the high impedance winding $\underline{\text{D1}}$ of the link busy-idle switch and the tertiary windings $\underline{\underline{\text{A1}}}$ through $\underline{\underline{\text{N1}}}$. Since the windings $\underline{\text{A1}}$ and $\underline{\underline{\text{A1}}}$ generate canceling fluxes, the net flux will be that generated by the winding A1 and thus the associated contacts *a*1 will be released. Additionally, since the control path includes both windings D1, $\underline{\text{D1}}$, the contacts of the link busy-idle memory element will be closed and the control path returned to the idle low impedance state. Advantageously, therefore, when a control path is pulsed to reset the link busy-idle elements of a path no longer required, the crosspoints of particular stages of the path will be released.

The priorly unoperated ferreeds, such as B1 . . . N1, of a selected column are unaffected by the addition of magnetomotive force from their third windings at time of release. In normal differential ferreed operation only the ferreed switch which corresponds to the intersection of the selected row and column is operated at the time the connection is established. The remaining ferreed switches of the selected row and of the selected column receive energizing currents which tend to release these switches if they had been closed, or to hold these switches in the released state. However, in switches incorporating my invention the ferreed switches of a column which are not associated with the selected row are all already in the released state when the connection is established. At time of release of switch A1, for example, the coincident energization of the column winding such as $\underline{\text{B1}}$ and the tertiary winding such as $\underline{\underline{\text{B1}}}$ does not alter the state of the ferreed. That is, at the time a connection was established in a selected ferreed, the member 13 of an unselected column ferreed is switched in the upward state while member 14 of such a switch is switched down. At time of release of the selected ferreed the state of member 13 of an unselected ferreed is not changed since the column winding portion 63 and the tertiary winding portion 65 generate canceling fields while the winding portion 64 tends to hold the member 14 in the previously established down state.

It is to be understood that the above description is illustrative of the principles of this invention and that many variations will be made by one skilled in the art without departing from the spirit and scope of the invention.

What is claimed is:

1. A switching network comprising a plurality of differentially wound ferreed switches arranged in a coordinate array, each ferreed switch comprising first, second and third control windings, the first windings of each switch of a column of said array being connected in series by a first control conductor, the second windings of each switch of a row of said array being connected in series by a second control conductor, one end of each of said first conductors and said second conductors being connected together;

each first control conductor further includes a link busy-idle switch having first and second control windings and switch contacts associated therewith, the control windings of the link busy-idle switch and the third windings of each ferreed switch of a link being connected in series with the corresponding first control conductor, and the switch contacts of the busy-idle switch are connected in parallel with the serially connected first control winding of the link busy-idle switch and the third control windings.

2. A switching network comprising a plurality of input links, a plurality of output links and a plurality of switching means arranged in a coordinate array for selectively interconnecting said input links and said output links, each of said input and output links comprising transmission paths and control conductors, each of said switching means comprising first, second and third control windings and contacts for interconnecting said transmission paths, the first windings of each switching means of a row of said array being connected in series by one of said input link control conductors, the second windings of each of said switching means of a column of said array being connected in series by one of said output link control conductors, each said output link control conductor further includes a link busy-idle means having first and second control windings and switch contacts associated therewith, the control windings of the link busy-idle means and the third windings of each switching means of an output link being connected in series with the corresponding output link control conductor, and the switch contacts of the output link busy-idle means are connected in parallel with one of said serially connected control windings of the link busy-idle means and the third control windings.

3. A switching network comprising a plurality of input links, a plurality of output links and a plurality of switching means for selectively interconnecting said input links and said output links, each of said links comprising only a transmission path and a control conductor for controlling the ones of said plurality of switching means associated therewith, each of said plurality of switching means includes operate control means and inhibit control means, and each of said output links further comprises a bistable switching means controlled by signals on the control conductor thereof for enabling the inhibit control means of said associated switching means.

4. A switching network in accordance with claim 3 wherein said switching means comprises a plurality of ferreed switches arranged in a coordinate array, each of said ferreed switches comprising first and second differentially wound operate windings and a third inhibit winding arranged to oppose one of said operate windings, said inhibit windings of the switches of a column of said array being serially connected, and said bistable switching means includes contact means for selectively bypassing said serially connected inhibit windings.

5. In a switching network, a plurality of switching means arranged in a coordinate array and each including first, second and third windings, said switching means being operated on energization of both said first and second windings and released on operation of only one of said first and second windings and said third winding being arranged when energized to counterbalance the effect of said first winding, and busy-idle switch means for including said third winding in series with said first winding of a specific switching means when said specific switching means is operated and for bypassing said third winding when said specific switching means is released.

References Cited

UNITED STATES PATENTS

| | | | |
|---|---|---|---|
| 3,183,487 | 5/1965 | Deeg | 340—166 |
| 3,238,306 | 3/1966 | Bohlmeijer. | |

WILLIAM C. COOPER, *Primary Examiner.*

L. A. WRIGHT, *Assistant Examiner.*